US012186782B2

(12) United States Patent
Shelton-Butler

(10) Patent No.: US 12,186,782 B2
(45) Date of Patent: Jan. 7, 2025

(54) APPARATUSES AND METHODS FOR WASHING PLASTIC STORAGE BAGS

(71) Applicant: Bag Washer, LLC, Littleton, CO (US)

(72) Inventor: Sherilou Shelton-Butler, Littleton, CO (US)

(73) Assignee: Bag Washer, LLC, Littleton, CO (US)

( * ) Notice: Subject to any disclaimer, the term of this patent is extended or adjusted under 35 U.S.C. 154(b) by 309 days.

(21) Appl. No.: 17/831,228

(22) Filed: Jun. 2, 2022

(65) Prior Publication Data

US 2022/0395873 A1 Dec. 15, 2022

Related U.S. Application Data

(60) Provisional application No. 63/210,319, filed on Jun. 14, 2021.

(51) Int. Cl.

| | |
|---|---|
| ***A47L 15/50*** | (2006.01) |
| ***B08B 9/00*** | (2006.01) |
| ***B08B 9/087*** | (2006.01) |
| ***B08B 11/02*** | (2006.01) |

(52) U.S. Cl.

CPC ............ *B08B 11/02* (2013.01); *A47L 15/505* (2013.01); *B08B 9/00* (2013.01); *B08B 9/087* (2013.01); *B08B 2209/085* (2013.01)

(58) Field of Classification Search

None

See application file for complete search history.

(56) References Cited

U.S. PATENT DOCUMENTS 11,091,287 B1 * 8/2021 Krechowiecki ......... B65B 67/12

OTHER PUBLICATIONS

Bag-E-Wash Homepage, Products page and Media page, website: https://www.bag-e-wash.com/index.html, printed Feb. 10, 2023, 4 pgs.

* cited by examiner

*Primary Examiner* — Levon J Shahinian

(74) *Attorney, Agent, or Firm* — Husch Blackwell LLP

(57) ABSTRACT

A bag washer for plastic storage bags is provided. The bag washer comprises a vertical component and a base component. The vertical component comprises a plurality of intersecting structs to form gaps. The vertical component is configured in size and shape to fit within a space between a first layer and a second layer of the plastic storage bag. The base component comprises a generally horizontal surface from which the vertical component extends.

14 Claims, 13 Drawing Sheets

APPARATUSES AND METHODS FOR WASHING PLASTIC STORAGE BAGS

CROSS-REFERENCE TO RELATED PATENT APPLICATIONS

This application claims priority to U.S. Provisional Patent Application No. 63/210,319, filed Jun. 14, 2021, entitled “APPARATUSES AND METHODS FOR WASHING PLASTIC STORAGE BAGS,” the content of which is herein incorporated by reference in its entirety.

BACKGROUND

The technology of the present application relates to an apparatus comprising a web of material used to facilitate washing and/or drying plastic storage bags, sometimes referred to as freezer bags or the like.

Plastic storage bags, such as a conventional ZIPLOC® bag, produced by S. C. Johnson & Son, have been in commerce for serval decades. The plastic storage bag has become ubiquitous in today’s society. The term plastic storage bag should be interpreted herein to include plastic bags with zipper or slider style locks, both single and multiple sliders, adhesive locks, unlocked plastic storage bags, and the like, to name but a few types of plastic storage bags.

The plastic storage bag is used for a variety of things. One use, of many, for plastic storage bags is the storage of items, such as, food (whether solid or liquid), household items, such as pencils, paperclips, and the like. The storage of these items, however, often results in the plastic storage bag becoming dirty or contaminated. Food, in particular, can be difficult as food can facilitate the growth of bacteria, mold, and the like that can contain toxins. Often, dirty, soiled, or contaminated plastic storage bags are simply discarded.

Within the recent past, the use of plastics in society has become an environmental concern. Plastics do not readily biodegrade. Rather, the plastic sits in landfills or otherwise litters the environment. Thus, some people attempt to reuse plastic storage bags. Reusing the plastic storage bag, however, is often hindered because the plastic storage bag is contaminated, with either dirt, food, or the like, and the plastic storage bag is difficult to wash and for reuse.

Thus, against this background, it would be desirable to provide apparatuses and methods for washing plastic storage bags.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In some aspects of the technology, a bag washer is provided. The bag washer comprises a vertical component and a base component. The vertical component comprises a plurality of intersecting structs to form gaps. The vertical component is configured in size and shape to fit within a space between a first layer and a second layer of a plastic storage bag. The base component comprises a generally horizontal surface from which the vertical component extends.

In some embodiments, the bag washer is formed by injection molded plastic. In some embodiments, the vertical component and the base component are formed of different plastics.

The plurality of intersecting structs are crisscrossed in certain aspects. The aspects the base component comprises perforations in the horizontal surface.

In some embodiments, the vertical component comprises a sidewall extending from the base component to a pinnacle. The vertical component may comprise first and second longitudinally extending sides. The vertical component may comprise first and second transversely extending sides. The vertical component may comprise a top (or cover). The top may comprise a plurality of top sides that converge to the pinnacle. The transitions between sides may be rounded or chamfered.

In some embodiments, the vertical component may comprise a continuous side. The continuous side may comprise a circular shape, an oblong shape, an oval shape, and elliptical shape, or the like.

In some embodiments, the base component may comprise an outer edge of the horizontal surface. An annular rim may extend from the outer edge of the horizontal surface to form a channel sized to receive the plastic storage bag.

In some embodiments, the bag washer may include an elastic member to secure the plastic storage back to the bag washer.

These and other aspects of the present system and method will be apparent after consideration of the Detailed Description and Figures herein.

DRAWINGS

Non-limiting and non-exhaustive embodiments of the present invention, including the preferred embodiment, are described with reference to the following figures, wherein like reference numerals refer to like parts throughout the various views unless otherwise specified.

Figure 7:
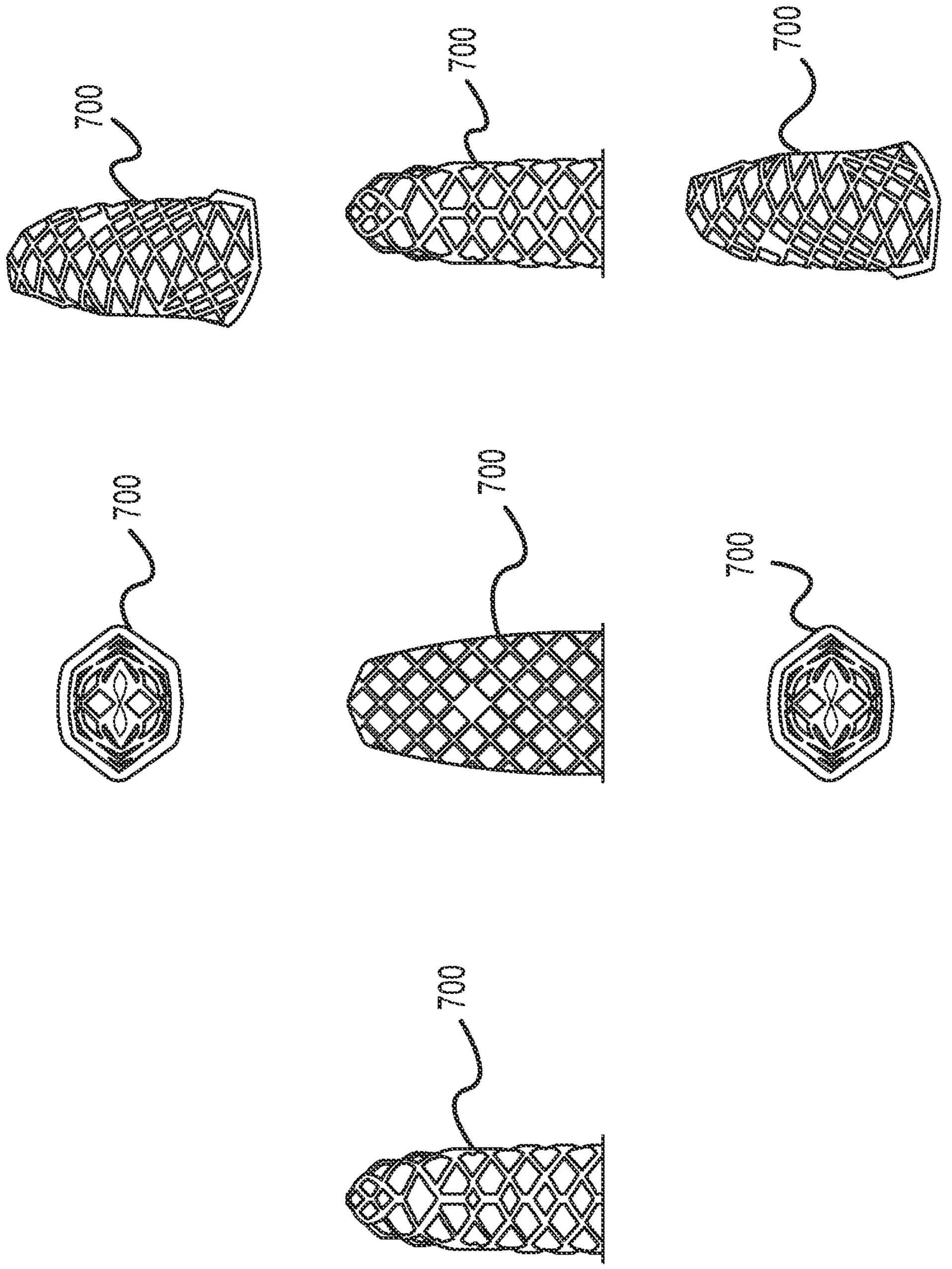

FIG. 7 comprises line drawings of alternative bag washers consistent with the technology of the present application.

Figure 8:
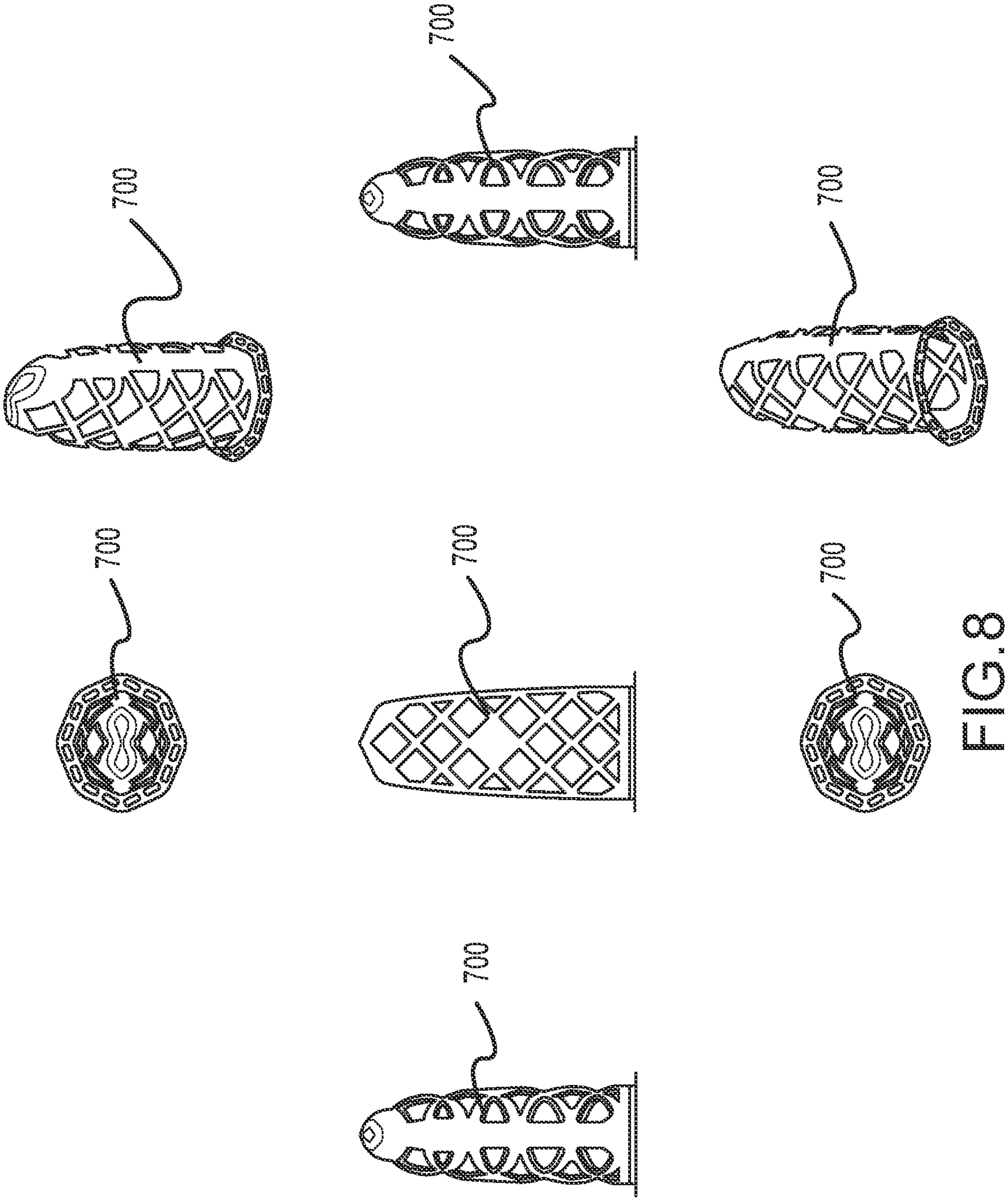

FIG. 8 comprises line drawings of another alternative bag washers consistent with the technology of the present application.

Figure 9A:
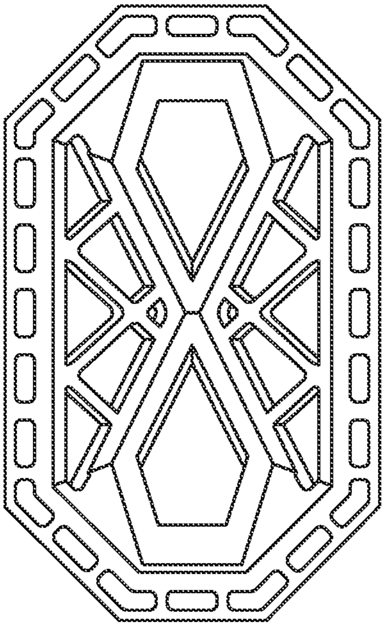
Figure 9B:
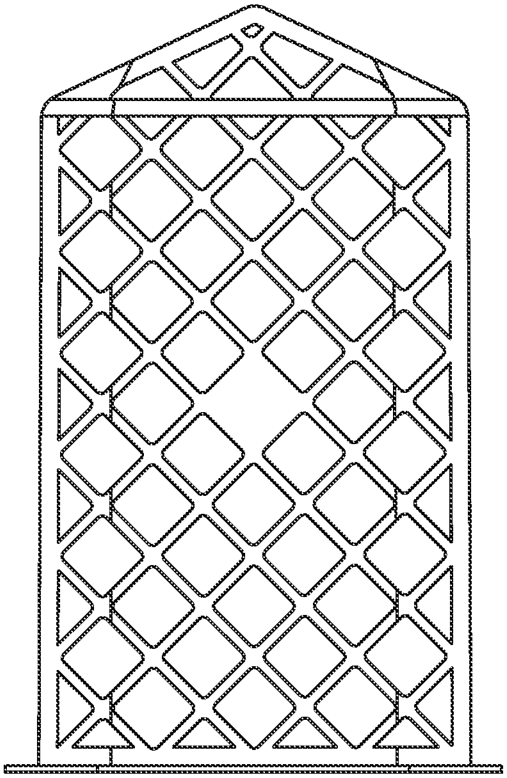
Figure 9C:
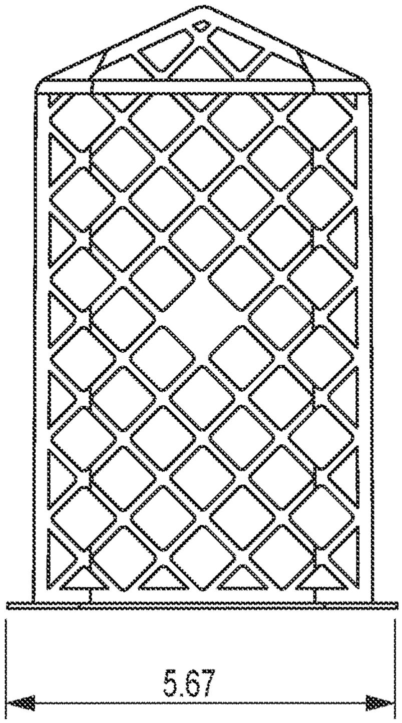
Figure 9D:
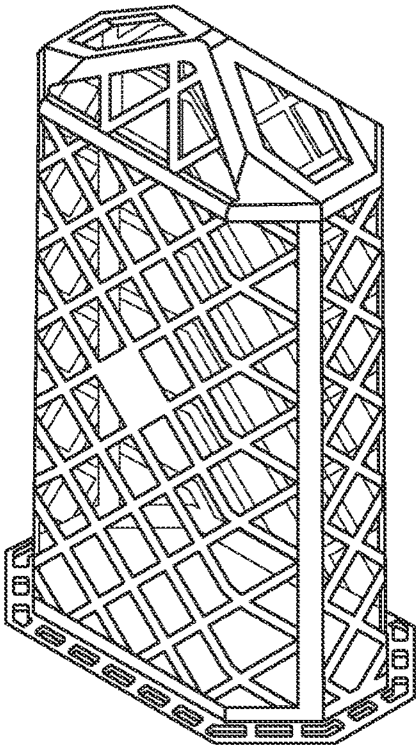
Figure 9E:
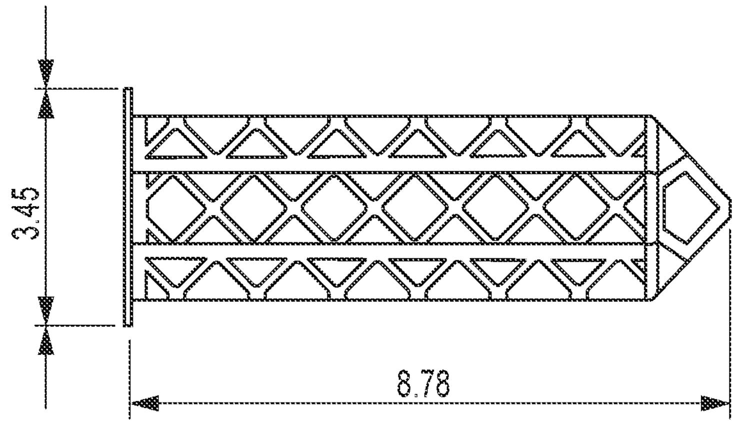
Figure 9F:
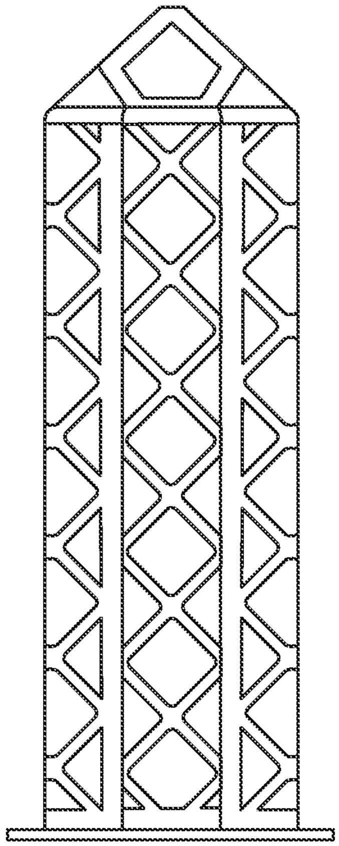
Figure 9G:
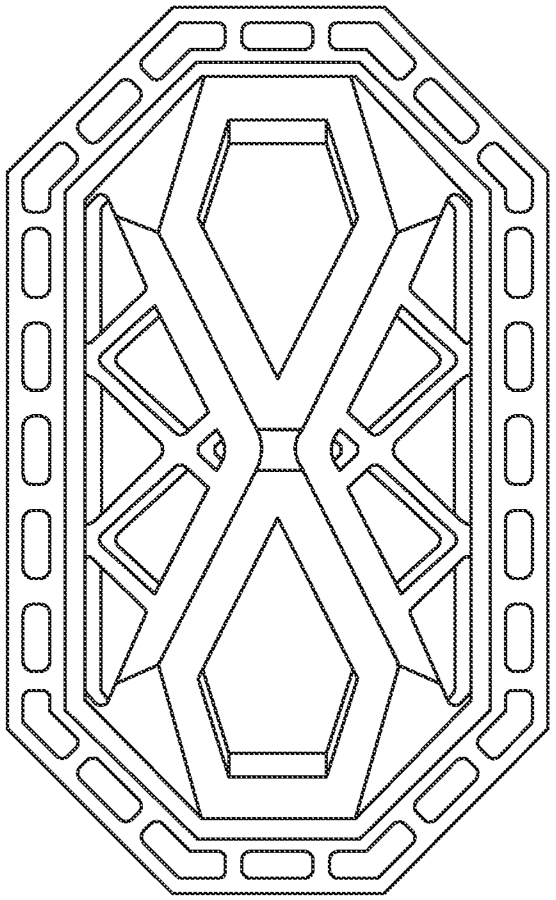
Figure 9H:
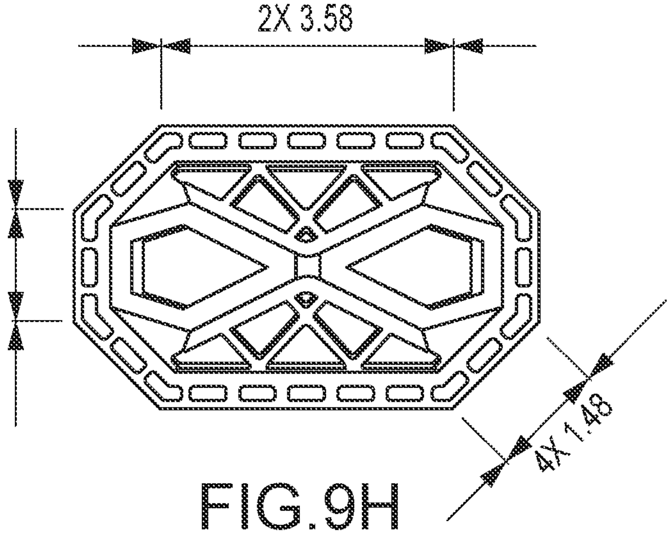

FIGS. 9A-9H comprise views of a bag washer consistent with the technology of the present application for a quart (non-limiting) storage bag. FIG. 9A is a bottom view. FIG. 9B is a front view. FIG. 9C is a front view with non-limiting dimensional information. FIG. 9D is an isometric view. FIG. 9E is a side view with non-limiting dimensional information. FIG. 9F is a side view. FIG. 9G is a top view. FIG. 9H is a top view with non-limiting dimensional information.

Figure 10A:
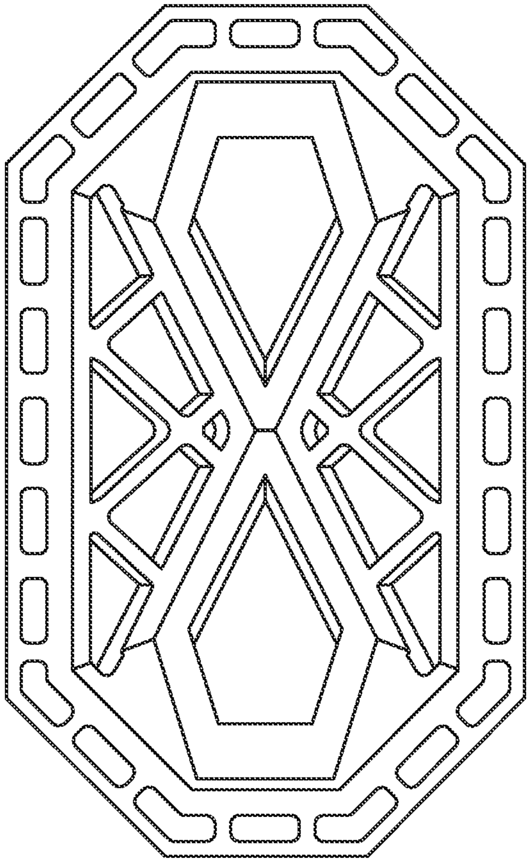
Figure 10B:
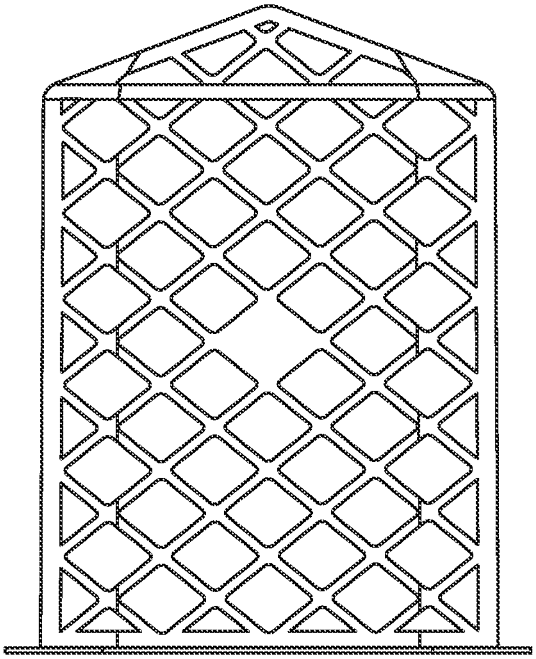
Figure 10C:
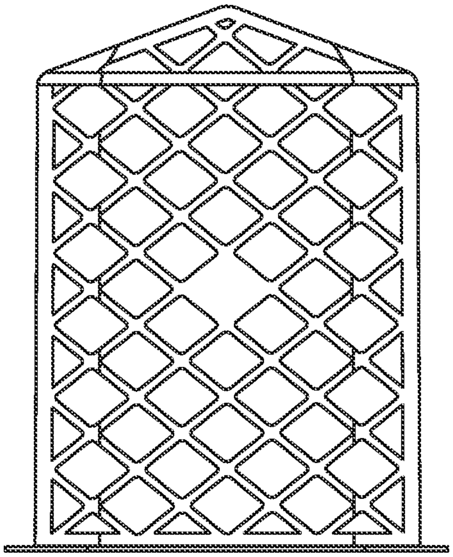
Figure 10D:
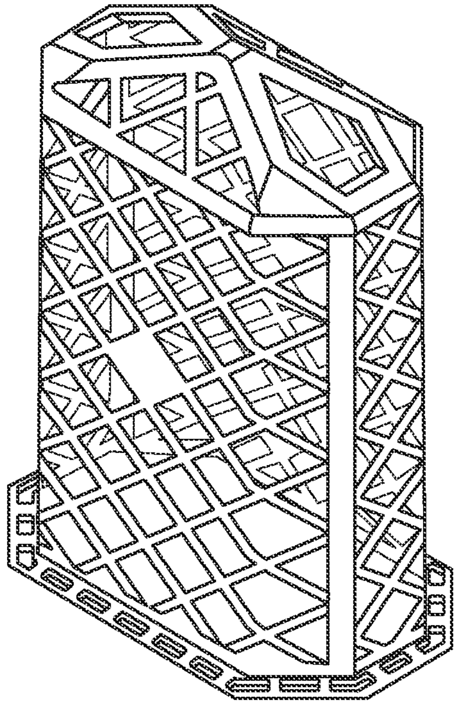
Figure 10E:
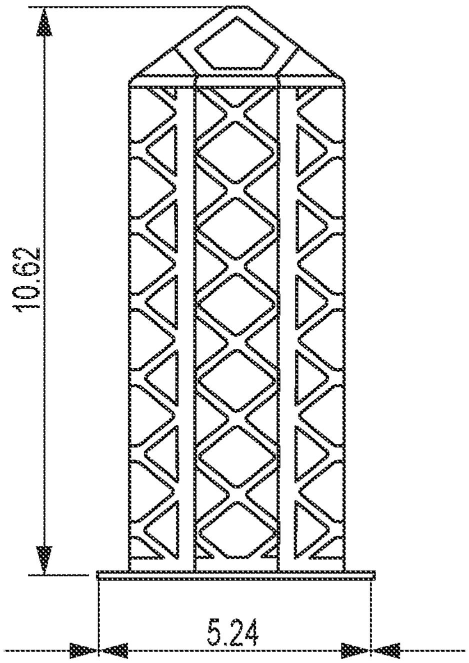
Figure 10F:
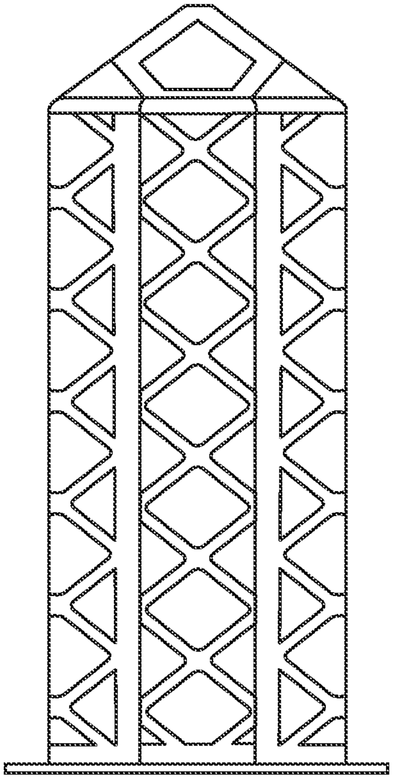
Figure 10G:
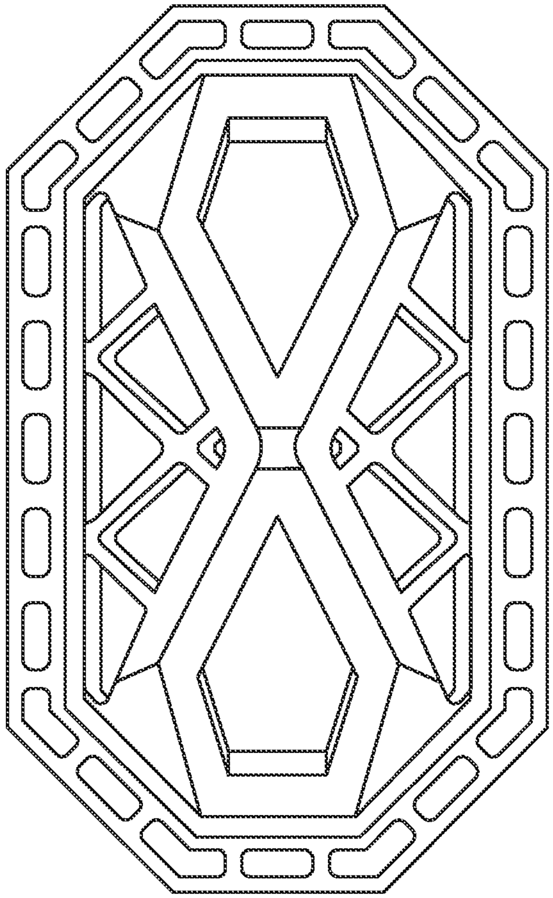
Figure 10H:
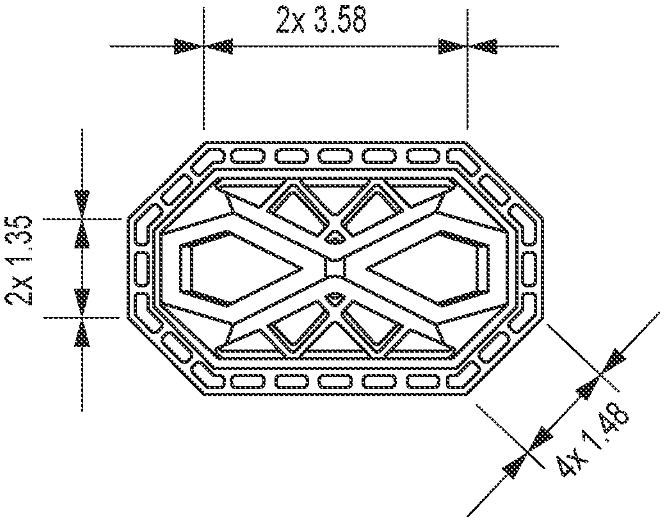

FIGS. 10A-10H comprise views of a bag washer consistent with the technology of the present application for a gallon (non-limiting) storage bag. FIG. 10A is a bottom view. FIG. 10B is a front view. FIG. 10C is a front view with non-limiting dimensional information. FIG. 10D is an isometric view. FIG. 10E is a side view with non-limiting dimensional information. FIG. 10F is a side view. FIG. 10G is a top view. FIG. 10H is a top view with non-limiting dimensional information.

DETAILED DESCRIPTION

The technology of the present application will now be described more fully below with reference to the accompanying figures, which form a part hereof and show, by way of illustration, specific exemplary embodiments. These embodiments are disclosed in sufficient detail to enable those skilled in the art to practice the technology of the present application. However, embodiments may be implemented in many different forms and should not be construed as being limited to the embodiments set forth herein. The following detailed description is, therefore, not to be taken in a limiting sense.

The technology of the present application is described with specific reference to washing and drying plastic storage bags, such as, for example, a conventional ZIPLOC® storage bag. However, the technology described herein may be used with applications other than those specifically described herein. Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Figure 1:
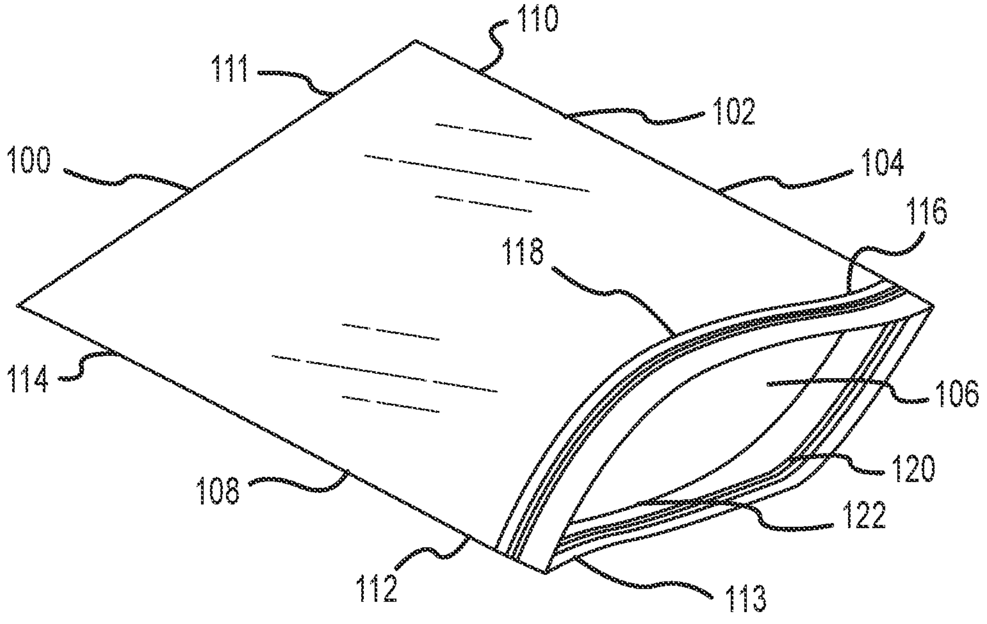
FIG. 1 is a perspective view of a plastic storage bag consistent with the technology of the present application.

With reference now to FIG. 1, is a perspective view of a plastic storage bag 100 usable with the technology of the present application. The plastic storage bag 100, which is a conventional ZIPLOC® storage bag, is generally known in the art and will not be completely explained herein except as required to provide context for the technology of the present application. The plastic storage bag 100 may be a single ply, dual ply, or multi-ply bag having a first layer 102 with an outer edge margin 104 and a second layer 106 with an outer edge margin 108. The first layer 102 and the second layer 106 are aligned and sealed along three (3) of four (4) edges 110, 111, 112, 113. The seal 114 may be a sonic weld, an adhesive, a heat fusion, or the like. The fourth edge 113 has a slider lock 116 with a first part 118 on the first layer 102 and a second part 120 on the second layer 106. The first part 118 may be a groove and the second part 120 may be a tongue that snap fits into the groove to form an openable seal. The first layer 102 and the second layer 106 have a space 122 therebetween in which items may be kept, such as, for example, food or household items.

As can be appreciated, plastic storage bag 100 is flexible. Thus, without contents contained in the space 122, the plastic storage bag 100 tends to flatten such that the inner surfaces of the first layer 102 and the second layer 106 touch. The flexibility, while good for storing items of inconsistent and random geometries, makes it difficult to wash and dry.

Figure 2:
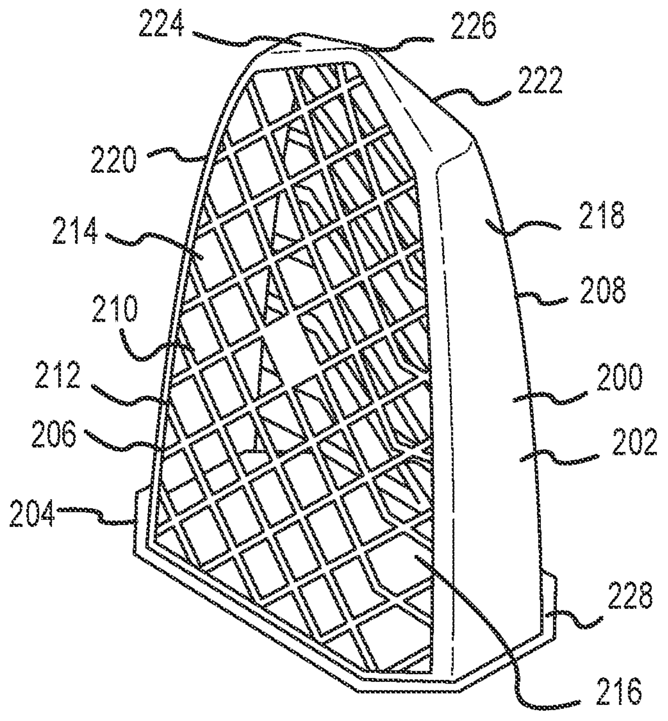
FIG. 2 is a perspective view of a bag washer for the plastic storage bag of FIG. 1 consistent with the technology of the present application.

A perspective view of a bag washer 200 consistent with the technology of the present application is shown in FIG. 2. The bag washer 200 is shown as a monolithic unit that is injection molded, but the bag washer 200 may be made by alternative methods and be comprised of parts that fit together. The bag washer 200, for reference, has a longitudinal component shown by L and a transverse component shown by T and a depth component shown by D. The bag washer 200, as shown, is formed of a vertical component 202 and a base component 204. The vertical component 202 is generally shaped to be consistent in shape to the space 122 formed by the first layer 102 and the second layer 106 of the plastic storage bag 100, above. In this exemplary embodiment, the bag washer has a first longitudinally extending side 206 and a second longitudinally extending side 208 opposite of and separated from the first side 206. The first longitudinally extending side 206 and the second longitudinally extending side 208 are formed by a web 210 of material. The web 210 is formed of crisscrossed structs 212, which are shown as diagonal but could be arranged in multiple ways, form gaps 214 (or fluid openings 214) that allow for fluid flow from the internal space 216 between the first longitudinally extending side 206 and the second longitudinally extending side 208 to the outside of the vertical component 202, which would be the space between the plastic storage bag 100's inner surfaces and the vertical component 202 of the bag washer 200.

The vertical component also comprises first transversely extending side 218 and second transversely extending side 220 opposite of and separated from the first transversely extending side 218. As shown, the first and second transversely extending sides 218, 220 are solid, but could be formed of a web of 210 of material as described above.

As can be appreciated on reading this disclosure, the first longitudinally extending side 206 is separated from the second longitudinally extending side 208 by the first, and second transversely extending sides 218, 220. Similarly, the first transversely extending side 218 is separated from the second transversely extending side 210 by the first and second longitudinally extending side 206, 208.

Also, while shown as distinct sides, the vertical component 202 may, in certain embodiments, formed by a cylindrical side, an oblong side, an elliptical side, a frustoconical side, to name but a few shapes. The vertical component also may be a customer designed shape, or a polygon shape. If the vertical component 202 is formed by a polygon shape, such as, for example, a rectangular shape in generally, or otherwise has edges, the edges of the shape may be chamfered or rounded such that the edges are less likely to damage the plastic storage bag 100.

Referring back to FIG. 2, the vertical component 202 has a top 222. The top 222 is shown as a convergence of top sides 224, shaped as triangles, to a pinnacle 226. The first and second longitudinally extending sides 206, 208 extend, outwardly and downwardly, from the edges 228 of the top side 224.

The bag washer 200 also has a base component 204. The base component 204 is a generally horizontal surface 228 from which the web first and second longitudinally extending sides 206, 208 and the first and second transversely extending sides 218, 220 extend. The surface 228 is shown as forming a contiguous perimeter around the vertical component 202, but could be a non-contiguous perimeter.

Figure 3:
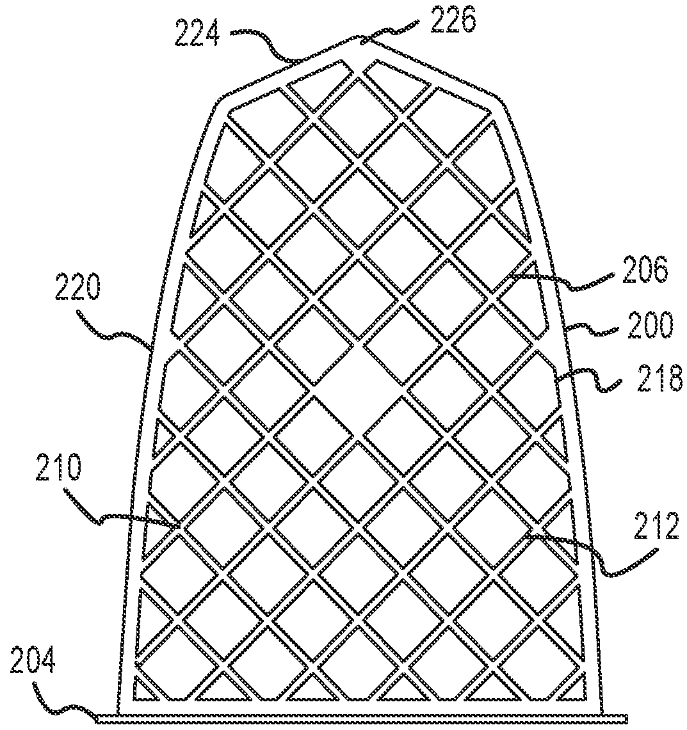
FIG. 3 is a side elevation view of the bag washer of FIG. 2.

FIG. 3 shows an elevation view of the bag washer 200. As can be seen, the bag washer 200 includes the base component 204, first (or second) longitudinally extending side 206 (208), first transversely extending side 218, second transversely extending side 220, the top sides 224 converging at the pinnacle 226. The first (or second) longitudinally extending side 206 (208) is shown as a web 210. In certain embodiments, one or more of the spaces formed by the crisscrossed structs 212 may be completely filled with the material. This may be for strength and/or an artifact of a production process. The material may be a plastic sufficient to not be deformable at the maximum temperature of a dishwasher.

Figure 4:
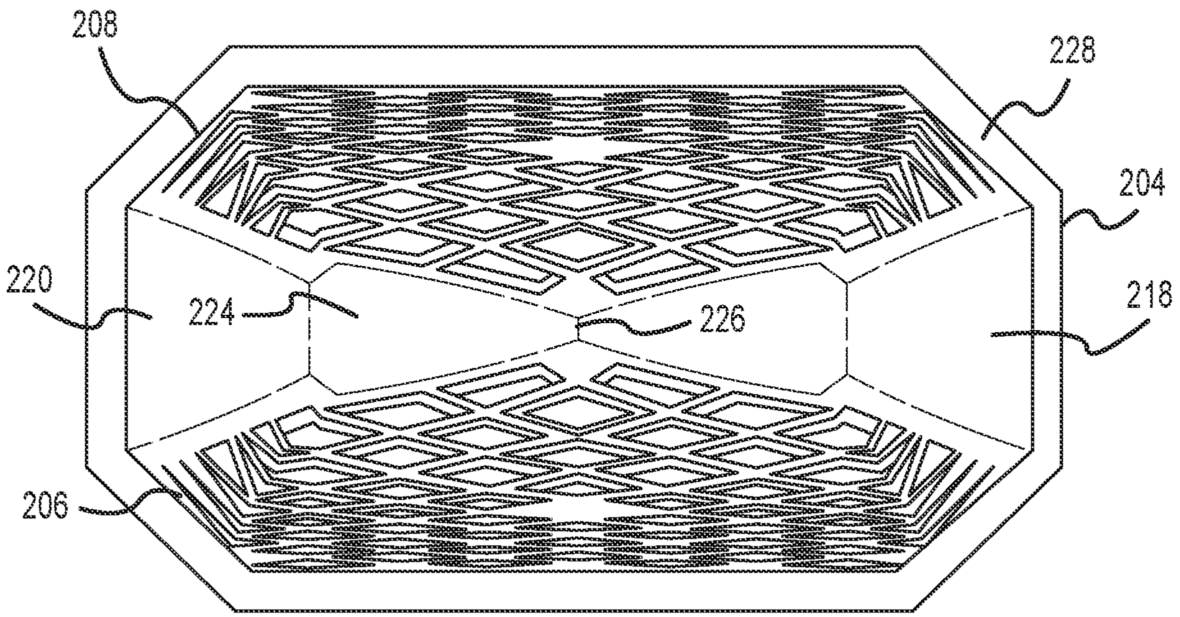
FIG. 4 is a top view of the bag washer of FIG. 2.

FIG. 4 shows a top plan view of the bag washer 200. The bag washer has the base component 204 and the vertical component 202. The base component includes the horizontal surface 228. The first and second longitudinally extending sides 206, 208 and the first and second transversely extending sides 218, 220 extend from the base component 204 to the top 222, which includes the top side 224 that converge at the pinnacle 226.

Figure 5:
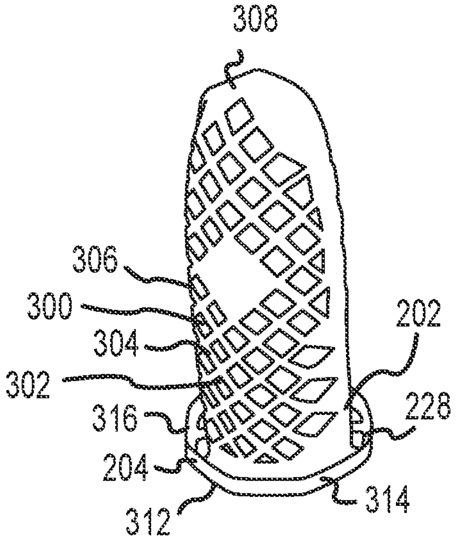
FIG. 5 is a perspective view of a bag washer consistent with the technology of the present application.

FIG. 5 shows a bag washer 300. The bag washer 300 is similar to the bag washer 200 described above in that it comprises a vertical component 202 and a base component 204. The vertical component comprises a generally cylindrical wall 302 formed from structs 304 that crisscross to form opening 306 that allow fluid to move across the cylindrical wall 302. The cylindrical wall 302 has a top 308, or cover 308, that is shown as generally solid portion that converges to a pinnacle.

Figure 6:
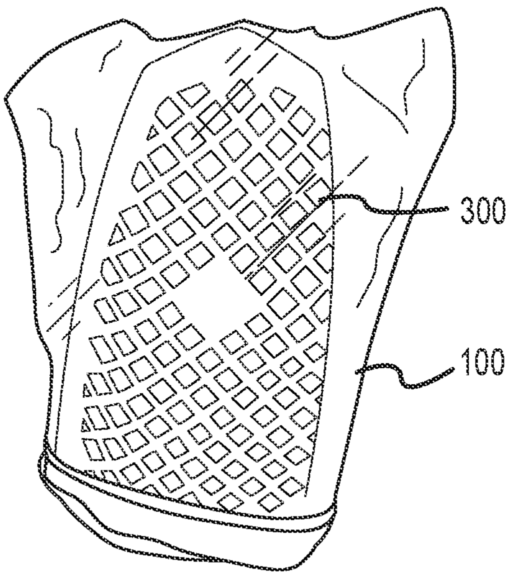
FIG. 6 is a perspective view of the bag washer of FIG. 5 with a plastic storage bag consistent with the technology of the present application.

The base component 204 also comprises a horizontal surface 228, similar to the above. However, the surface 228 is perforated by holes 310. Also, the surface 228 has an outer edge 312 with an annular rim 314 such that a channel 316 is formed. As shown best in FIG. 6, the fourth edge 113 can be fitted into the channel 316 to hold the plastic storage bag 100 in place when the bag washer 300 is fitted into the space 122 formed between the first layer 102 and the second layer 106. Optionally, an elastic member such as a rubber band or the like may be used to secure the plastic storage bag 100, or the fourth edge 113, to the vertical component 202. As can be appreciated from FIG. 6, the bag washer 300 (or 200) in placed into the plastic storage bag 100, and the combined unit 320 of the bag washer 300 (or 200) and plastic storage bag 100 may be placed into a dishwasher. During the normal wash and dry cycle of the dishwasher, the openings 306 (or gaps 214) allow fluid communication across the base washer 300, whether water, air, or other fluid, to wash and/or dry the plastic storage bag.

FIGS. 7 and 8 show other configurations of possible bag washers. As can be appreciated, the vertical components 700 in FIGS. 7 and 8 may differ but the openings or gaps are present to allow fluid movement from inside to outside of the vertical component 700.

FIGS. 9A-9H comprise views of a bag washer 900 consistent with the technology of the present application for a quart (non-limiting) storage bag. FIG. 9A is a bottom view. FIG. 9B is a front view. FIG. 9C is a front view with non-limiting dimensional information. FIG. 9D is an isometric view. FIG. 9E is a side view with non-limiting dimensional information. FIG. 9F is a side view. FIG. 9G is a top view. FIG. 9H is a top view with non-limiting dimensional information.

FIGS. 10A-10H comprise views of a bag washer 1000 consistent with the technology of the present application for a gallon (non-limiting) storage bag. FIG. 10A is a bottom view. FIG. 10B is a front view. FIG. 10C is a front view with non-limiting dimensional information. FIG. 10D is an isometric view. FIG. 10E is a side view with non-limiting dimensional information. FIG. 10F is a side view. FIG. 10G is a top view. FIG. 10H is a top view with non-limiting dimensional information.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term “approximately.” At the very least, and not as an attempt to limit the application of the doctrine of equivalents to the claims, each numerical parameter recited in the specification or claims which is modified by the term “approximately” should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A bag washer comprising,
- a vertical component comprising a web of material with gaps, wherein the vertical components comprise,
  - a first longitudinally extending side formed of a plurality of crisscrossed structs,
  - a second longitudinally extending side formed of a plurality of crisscrossed structs,
  - a first transverse side coupling the first longitudinally extending side and the second longitudinally extending side, and
  - a second transverse side coupling the second longitudinally extending side and the second longitudinally extending side; and
- a base component comprising a horizontal surface from which the vertical component extends, wherein the vertical component is sized and shaped to fit between a first layer and a second layer of a plastic storage bag.

2. The bag washer of claim 1 wherein the web of material is an injection molded plastic.

3. The bag washer of claim 1 wherein the first transverse side and the second transverse side comprise a plurality of crisscrossed struts.

4. The bag washer of claim 1, wherein the vertical component comprises a top that converges at a pinnacle.

5. The bag washer of claim 1, wherein at least the first transverse side and the second transverse side are formed without gaps.

6. The bag washer of claim 1, wherein the base component is non-contiguous.

7. The bag washer of claim 1, wherein the vertical component shape is selected from a group of shapes consisting of: circular, elliptical, oblong, or a polygon.

8. The bag washer of claim 1, wherein transitions between the first longitudinally extending side, a second longitudinally extending side, a first transverse side, and a second transverse side are chamfered.

9. A bag washer bag washer comprising,
- a vertical component comprising a web of material with gaps; and a base component comprising a horizontal surface from which the vertical component extends, wherein the vertical component is sized and shaped to fit between a first layer and a second layer of a plastic storage bag, wherein the base component has an outer edge on the horizontal surface and comprises an annular rim extending from the outer edge of the horizontal surface, to receive the plastic storage bag.

10. A structure to allow washing and drawing of a plastic storage bag, comprising:

a vertical component comprising an injection molded web material, wherein the vertical component comprises, a first longitudinally extending side formed of a plurality of crisscrossed structs forming gaps configured to allow fluid to pass between the gaps to wash the plastic storage bag, a second longitudinally extending side formed of a plurality of crisscrossed structs forming gaps configured to allow fluid to pass between the gaps to wash the plastic storage bag, a first transverse side coupling the first longitudinally extending side and the second longitudinally extending side, and a second transverse side coupling the second longitudinally extending side and the second longitudinally extending side a base component comprising a horizontal surface from which the vertical component extends, wherein the vertical component is sized and shaped to fit between a first layer and a second layer of a plastic storage bag; and a top coupled to the vertical component distal to the base component, wherein the top comprises a plurality of injection molded structs that converge at a pinnacle.

11. The structure of claim 10 wherein at least one of the first transverse side or the second transverse side comprises a solid injection molded plastic.

12. The structure of claim 10 wherein the base component forms an opening through which fluid freely passes into the vertical component and through the gaps.

13. The structure of claim 12 wherein the base component comprises a flanged surface extending outwardly from the opening and is configured to engage a corresponding opening of the plastic storage bag.

14. The structure of claim 10 wherein the base component is contiguous.

* * * * *